(12) United States Patent
Wong

(10) Patent No.: US 10,073,883 B1
(45) Date of Patent: Sep. 11, 2018

(54) RETURNING QUERY RESULTS

(71) Applicant: Amazon Technologies, Inc., Seattle, WA (US)

(72) Inventor: Cherie Wong, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 458 days.

(21) Appl. No.: 14/725,676

(22) Filed: May 29, 2015

(51) Int. Cl.
*G06Q 30/00* (2012.01)
*G06F 17/30* (2006.01)
*G06Q 30/06* (2012.01)

(52) U.S. Cl.
CPC .. *G06F 17/30442* (2013.01); *G06F 17/30286* (2013.01); *G06F 17/30864* (2013.01); *G06Q 30/0625* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 8,117,197 B1* | 2/2012 | Cramer | ............ | G06F 17/30702 706/12 |
| 2006/0122914 A1* | 6/2006 | Moroney | .......... | G06F 17/30867 705/26.62 |
| 2007/0185865 A1* | 8/2007 | Budzik | ............. | G06F 17/30389 |
| 2009/0119276 A1* | 5/2009 | Neron | ................ | G06F 17/30864 |
| 2009/0132517 A1* | 5/2009 | Schneider | ......... | G06F 17/30864 |
| 2011/0307337 A1* | 12/2011 | Wilson | ............... | G06Q 30/0267 705/14.64 |
| 2014/0279078 A1* | 9/2014 | Nukala | ............... | G06Q 30/0243 705/14.73 |
| 2015/0339756 A1* | 11/2015 | Konik | ................ | G06O 30/0631 705/26.7 |

OTHER PUBLICATIONS

Kim, Jeonghyun, Characterizing Queries in Different Search Tasks, Jan. 1, 2012, 1201 45th Hawaii International COnference on System Sciences, pp. 1697-1706 (Year: 2012).*

* cited by examiner

*Primary Examiner* — William J Allen
*Assistant Examiner* — Timothy J Kang
(74) *Attorney, Agent, or Firm* — Kilpatrick Townsend & Stockton LLP

(57) ABSTRACT

Techniques for providing information based on a query may be described. For example, a query of a user may be received. Thee query associated with an item. A context associated with at least one of the query, the user, or the item may be determined. Information about the item may be identified based on the query. Additional information may also be identified based on the context. A query result that may include the information and the additional information may be generated. The generated query result may be provided in response to the query.

20 Claims, 9 Drawing Sheets

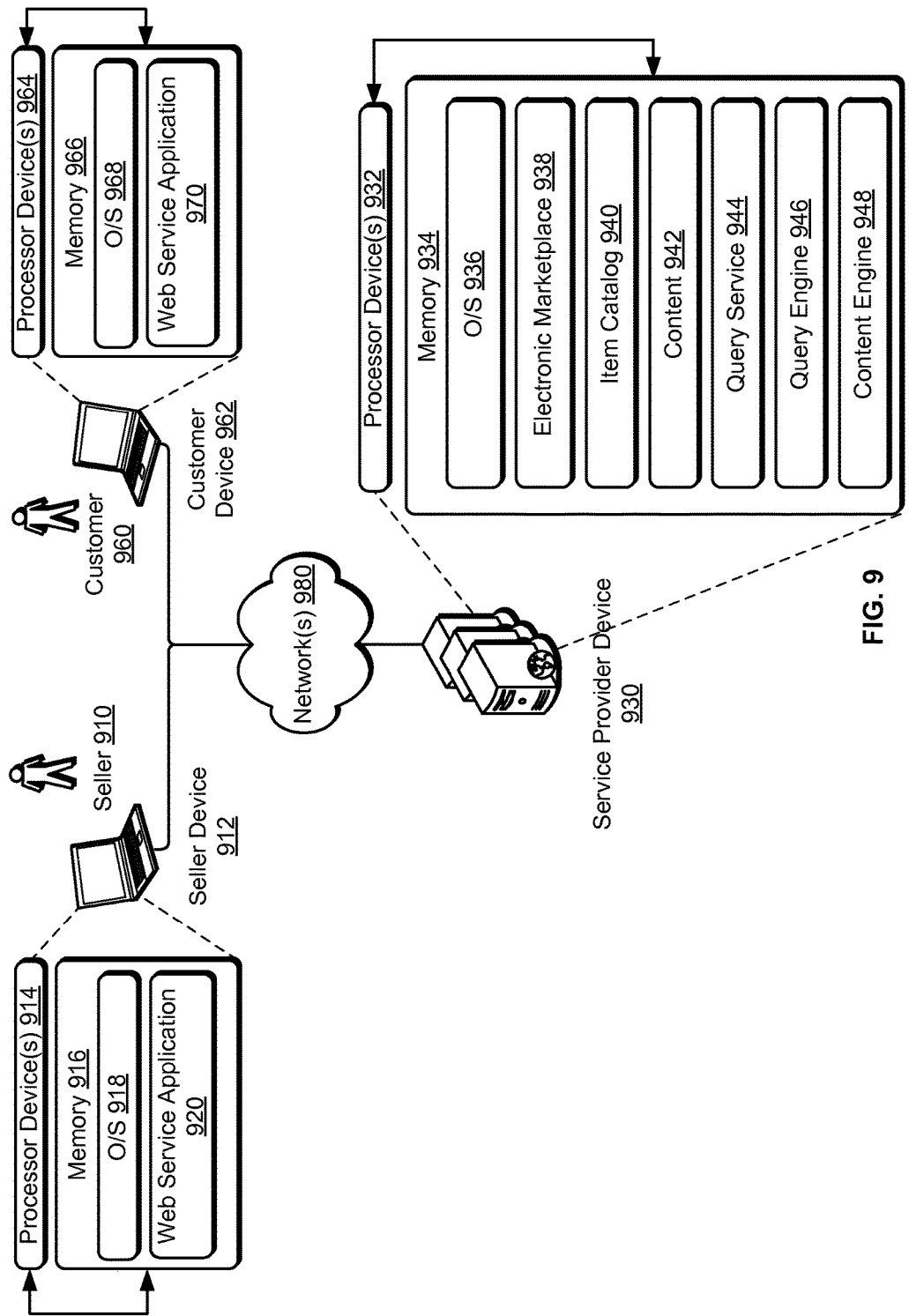

RETURNING QUERY RESULTS

BACKGROUND

More and more users are turning to network-based resources, such as electronic marketplaces, to purchase items (e.g., goods and/or services). A network-based resource may provide a user experience unmatched by a more traditional brick and mortar store. For example, the network-based resource may offer a larger and more diverse selection of items. Further, for some of the items, there may be a number of sellers with different offers. As such, a customer may not only have access to a rich item selection, but may also obtain items at the most convenient offers.

Typically, a user (e.g., a customer) may operate a computing device to access a network-based resource. The network-based resource may provide information about a plurality of items. The user may view some of the information, request other information, or perform other actions related to the information available from the network-based resource.

BRIEF DESCRIPTION OF THE DRAWINGS

Various embodiments in accordance with the present disclosure will be described with reference to the drawings, in which:

FIG. 9 illustrates an example architecture for providing a network-based resource, including at least one user device and/or one or more service provider devices connected via one or more networks, according to embodiments.

DETAILED DESCRIPTION

Figure 1:
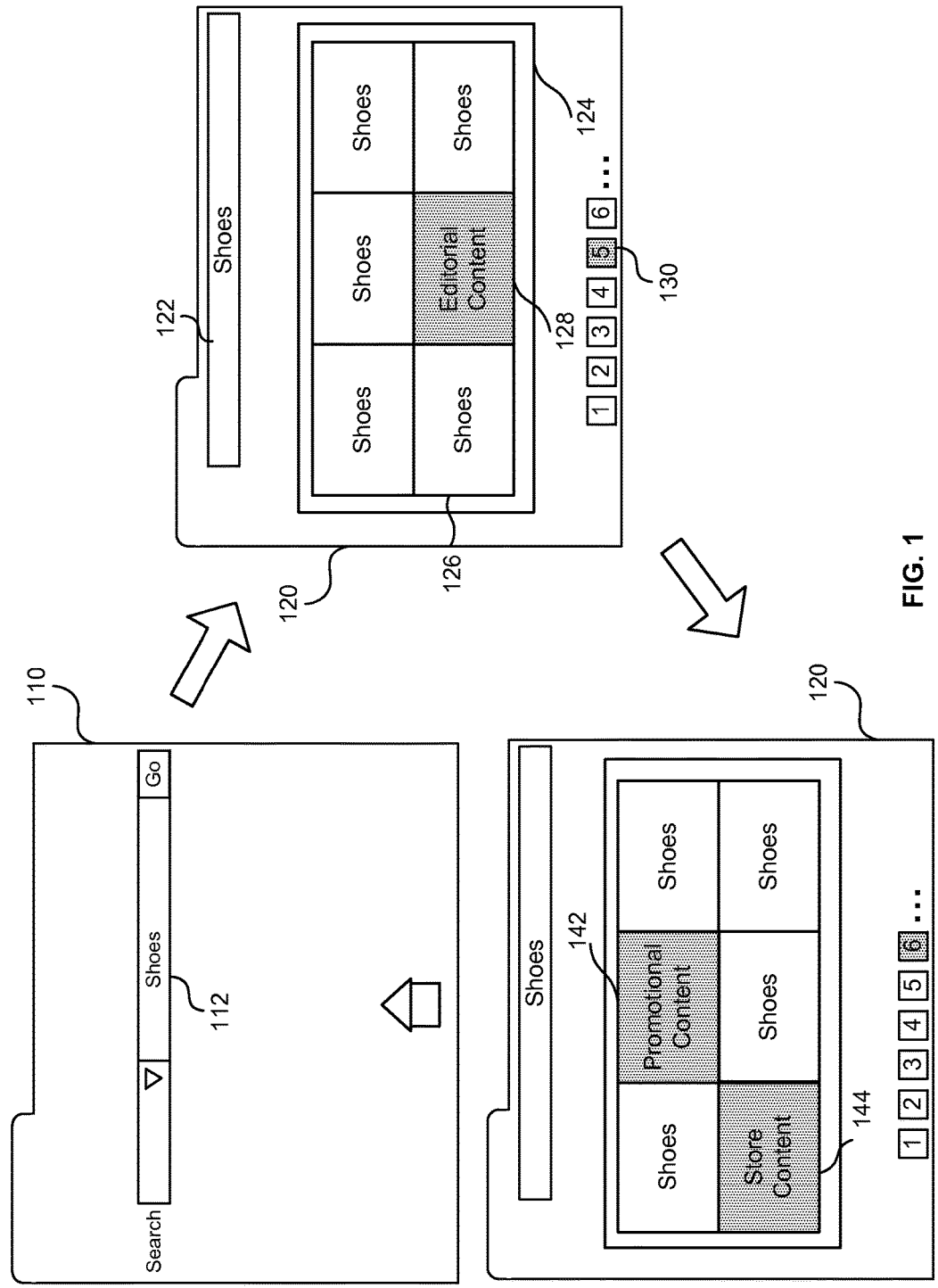
FIG. 1 illustrates an example interface for presenting information about items, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing information about items. In particular, a network-based resource may have access to information associated with items. Upon a query received from a computing device of a user for information about some of the items, applicable information may be provided to the computing device for presentation. The query may reflect an interest of the user in the items. In certain situations, the amount of the provided information may be large. Because of the large amount, the user may not view all of the provided information. Even if viewed, the provided information may not completely answer the user's interest. As a result, the user may not be satisfied with the provided information and may abandon the query. For example, the user may submit another query or may access a different network-based resource to submit the same or a similar query.

To avoid such abandonment or to enhance the user's experience associated with interactions with the network-based resource, a query result may be augmented to include additional information that may be of potential interest to the user. For example, a context of the query, the user, or the one or more items may be determined. The context may be used to identify the additional information. The additional information may be inserted in the query result, along with the other provided information. The context may also be used to determine a location for presenting, in a user interface of the computing device, the additional information relative to the other information. The location of the additional information may be selected in a way that may reduce the likelihood of the user's abandonment. For example, a portion of the other information (e.g., a smaller amount than the total amount) may be presented followed by a presentation of the additional information. The user may more likely view the portion of the other information before abandoning. If that portion does not satisfy the user's interest, the user may view the additional information. Because the additional information may represent another potential interest of the user, the user may be enticed to further interact with the network-based resource based on the additional information.

To illustrate, consider an example of a network-based resource configured to provide functions of an electronic marketplace. The electronic marketplace may offer various items, such as shoes of different styles and brands. A customer may operate a computing device to submit a query looking for shoes. The user's interest in shoes may be broad. Thus, the query may also be broad and may use general keywords associated shoes rather than with a particular brand or style. Accordingly, the query result may be large and may include information about a large number of shoes, in the hundreds or even thousands. The query result may be organized in pages for presentation at a user interface of the computing device (e.g., one provided by a browser). Each page may present a portion of the information (e.g., information about ten shoes). In other words, the query result may be organized for presentation in a large number of pages (e.g., one hundred pages if there were one thousand relevant shoes). However and in many situations, the user may not view all of the pages. Instead, the user may abandon the query after viewing a particular number of pages (e.g., ten pages out of the one hundred pages).

To avoid the user's abandonment, a context of the query may be determined. The context may be used to insert additional information in the query result for presentation at particular pages. The additional information may include a promotion on particular shoes, an upcoming season trend about a particular shoe style, or an identifier of an electronic store offering a particular brand(s) or style(s). The context may indicate how specific the query may be, an expected behavior of the user associated with viewing the query result (e.g., an expected abandonment point), and/or what potential interest the user may have in shoes. What and where to insert the additional information may be based on the context. For example, if the query is broad, information about the upcoming season trend may be more relevant to the user than a promotion on particular shoes. In this case, the information about the upcoming season trend may be inserted in the query result and presented close to the potential abandonment point (e.g., pages nine and ten). In comparison, if the query is much narrower (e.g., specifying a particular brand of shoes), information about a promotion on the brand of shoes or similar shoes may be more relevant to the user. In this case, this information may be inserted in the query result and presented in one or more of the earlier pages (e.g., pages four and five).

In the interest of clarity of explanation, the embodiments described herein illustrate usages of a network-based resource such as a web site associated with an electronic marketplace to provide information about items. However, the embodiments are not limited as such. Instead, the embodiments may similarly apply to any other source(s) of information. In particular, a source of information may include information about items, regardless of whether the source of information may be used to facilitate offers related to the items. The same source of information or another source of information may include additional information about the items and/or about other items. Further, an item may be tangible (e.g., a pair of shoes, a digital music record, etc.) or intangible (e.g., a service, a topic of discussion, etc.).

More generally, the embodiments described herein may be directed to, among other things, providing a query result in response to a query. The query result may include information from an information source based on the query and may include additional information from a same or a different information source based on a context associated with the query. The information and the additional information may be associated with the same or with different items.

Furthermore, augmenting a query result may be computationally challenging. For example, proper and efficient techniques may need to be used to properly associate additional information with a query (e.g., such that the additional information may become a part of the query result). Such techniques may improve, for example, how the additional information may be linked to queries in database (s) for querying purposes and how fast such queries may be performed.

The computational challenge may be further exacerbated within the context of an electronic marketplace that may offer millions and millions of items. In particular, a very large amount of available information may be maintained for querying purposes. The electronic marketplace may represent a complex computing environment configured to, in part, facilitate millions of transactions based on this very large amount of information.

Turning to FIG. 1, an example of an interface for presenting information about items is illustrated. In particular, the interface may include a number of web pages for searching and presenting, for example, offers from an electronic marketplace. An offer may represent a listing of an item available for ordering from the electronic marketplace according to a number of attributes (e.g., features of the item, offered price, available delivery method, etc.). An offer of an item may be an example of a type of information available from the electronic marketplace about the item. Other types of information may be also available.

A web page may be an example of a network-based document that may be provided by a network-based resource (e.g., a web site) associated with the electronic marketplace. The web page may be presented at a user interface of a user's computing device.

In an example, a web page 110 may provide a search field 112 to search for information available from the electronic marketplace. The information may be associated with one or more items offered at the electronic marketplace. Based on input to the search field 112, a search request for the information may be generated. The search request may represent an example of a query for the item (e.g., for information about the item).

Based on the query, applicable information may be determined. The applicable information may be returned in a query result. In particular, the query result may include information found based on the query and additional information found based on a context associated with the query. For example, if the query is for shoes, information about shoes available from the electronic marketplace may be returned in the query result. Furthermore, additional information such as promotions on particular brands of shoes, an expected trend for shoes, or an identifier of a shoe store, may be also returned in the search result. In other words, the query result may include individual results, where each individual result may correspond to a portion of the information (e.g., a particular pair of shoes) or to a portion of the additional information (e.g., a particular promotion). Each of the individual result, when presented, may be linked to one or more web pages that may be configured to provide various function related to the respective individual result. For example, an individual result showing an offered pair of shoes may, when selected, provide access to a web page for reviewing a description and purchasing the pair of shoes. In another example, an individual result showing a promotion may, when selected, provide access to a web page describing the promotion and providing instructions for taking advantage of the promotion.

The query result may be presented at a web page 120. The web page 120 may identify the query, the item, or the item category (e.g., "shoes") in a title field 122. The web page 120 may also include a space 124 configured to present the query result. The query result may be presented in the space 124 in a particular format such as a list, a tile, or other formats. Further, the space 124 may be configured to concurrently present the information found based on the query and the additional information found based on the context. For example, the information may be presented in one location 126 (or position) of the space 124, whereas the additional information may be presented in another location 128 of the space 124. Each location may represent a click depth. The click depth may also be a parameter used as a part of the context associated with the query.

Because the size of the query result (e.g., the amount of the information and the additional information) may be large (e.g., thousands of found shoe brands and styles), the presentation of the query result may span multiple page views 130. Each of the page views 130 may represent a presentation space (e.g., a portion of the space 124) that may limit the amount of presented information to a certain size. For example, each page view 130 may list a total of six individual results (as illustrated in FIG. 1, or some other number). As such, the first page view may present six individual results, the next page view may present the next six individual results, and so on and so forth. The number of individual results per page view may depend on the capability of the computing device presenting the web page 120, may be user selected, or may be predefined. A respective number of a page view or the order of the page view in the series of page views (e.g., page view number five as illustrated in FIG. 1) may represent a page depth. The page depth may also be a parameter used as a part of the context associated with the query.

As illustrated in FIG. 1, organizing the query result across the page views may consider the relevance of the individual results and the context associated the query. For example, the query result may include a ranking of the information based on the respective relevance. As such, more relevant information may be presented at earlier page views (e.g., page view five relative to page view six).

The context associated with the query may be used to determine the type and/or the location in the space 124 to insert the additional information. As illustrated in FIG. 1, editorial content may be inserted in the location 128 on page view five, whereas promotional content and store content may be inserted in locations 142 and 144, respectively, of page view six. The editorial content, promotional content, and store content may be examples of different types of additional information. The editorial content may describe an expected trend associated with a demand for the one or more items. The promotional content may describe a promotion associated with the one or more items. The store content describes an electronic store of the electronic marketplace offering the one or more items.

Generally, the context associated with the query may include various parameters related a category of items, a specificity of the query, and/or an expected user behavior. In an embodiment, the category may be associated with a rule. In an example, the rule may define static locations to insert particular types of content. For instance, the rule may specify that for shoes, editorial content are to be inserted at the location 128. In another example, the rule may define weights for the different parameters. The parameters may be accordingly applied to dynamically select a type of content and determine a respective insertion location.

In an embodiment, a query may be associated with a particular specificity. The specificity may represent a parameter of the context. For example, the query may include one or more keywords. The specificity of the query may be based on such keyword(s). The longer the query (e.g., the larger the number of keywords), the more specific the query may be. Similarly, the more specific the keywords (e.g., a keyword identifying a particular item), the more specific the query may be. Further, the specificity may dependent on the search field 112 itself. For example, the search field 112 may be presented in association with a home page. In another example, the search field 112 may be presented in association with a particular item category. The resulting query of the former example may be broader than that of the latter example The specificity of the query may be used (alone or in conjunction with other parameters) to dynamically select a type of content and determine a respective insertion location. For example, a broad query for shoes (e.g., one with "shoes" as the only keyword) may indicate a broad and, to some extent, undefined interest of a user in shoes. As such, the first few page views may not include additional information (e.g., any of the editorial, promotional, or store content). At much later page views, editorial content or store content may be presented. At even much later page views, promotional content may be presented. In comparison, a narrow query (e.g., one with "running shoes of brand ABC model XYZ") may indicate a well-defined user interest in a particular shoe brand, style, and model. In this case, the promotional content may be presented in a much earlier page view (e.g., may be the second or even the first page view).

This approach for using the specificity of the query may reflect a strategy associated with reducing the likelihood of the user abandoning the query result (e.g., starting another query or leaving the electronic marketplace altogether). In particular, the strategy may assume that, the broader the query, the more willing the user may be to view a larger number of page views to satisfy his or her interest. Conversely, the strategy may assume that, the narrower the query, the smaller the willingness of the user and the higher the potential for early abandonment may be.

In an embodiment, a particular behavior of the user to view the query result may be expected. The expected user behavior may represent a parameter of the context. The expected behavior may be based on past interactions of the user with the electronic marketplace (e.g., the user clickstream including the page depths, click depths, resulting conversions, and/or resulting abandonments). The expected behavior may also be based on similar interactions of other users. The expected behavior may be used (alone or in conjunction with other parameters) to dynamically select a type of content and determine a respective insertion location. For example, if users tend to abandon query results for shoes after the seventh page view, page views five, six, and seven may incrementally present editorial, promotional, and store content.

Hence, by using a context associated with a query to insert additional information in a query result and to strategically present such additional information, the likelihood of abandonment may be reduced while the overall user's experience may be improved. In particular, in response to a broad query reflecting an uncertain interest of the user, the additional information may guide the user to a narrower the interest. In comparison, in response to a narrow query reflecting a well-defined interest, the additional information may help the user to take action based on this interest or to explore other potential interests.

Figure 2:
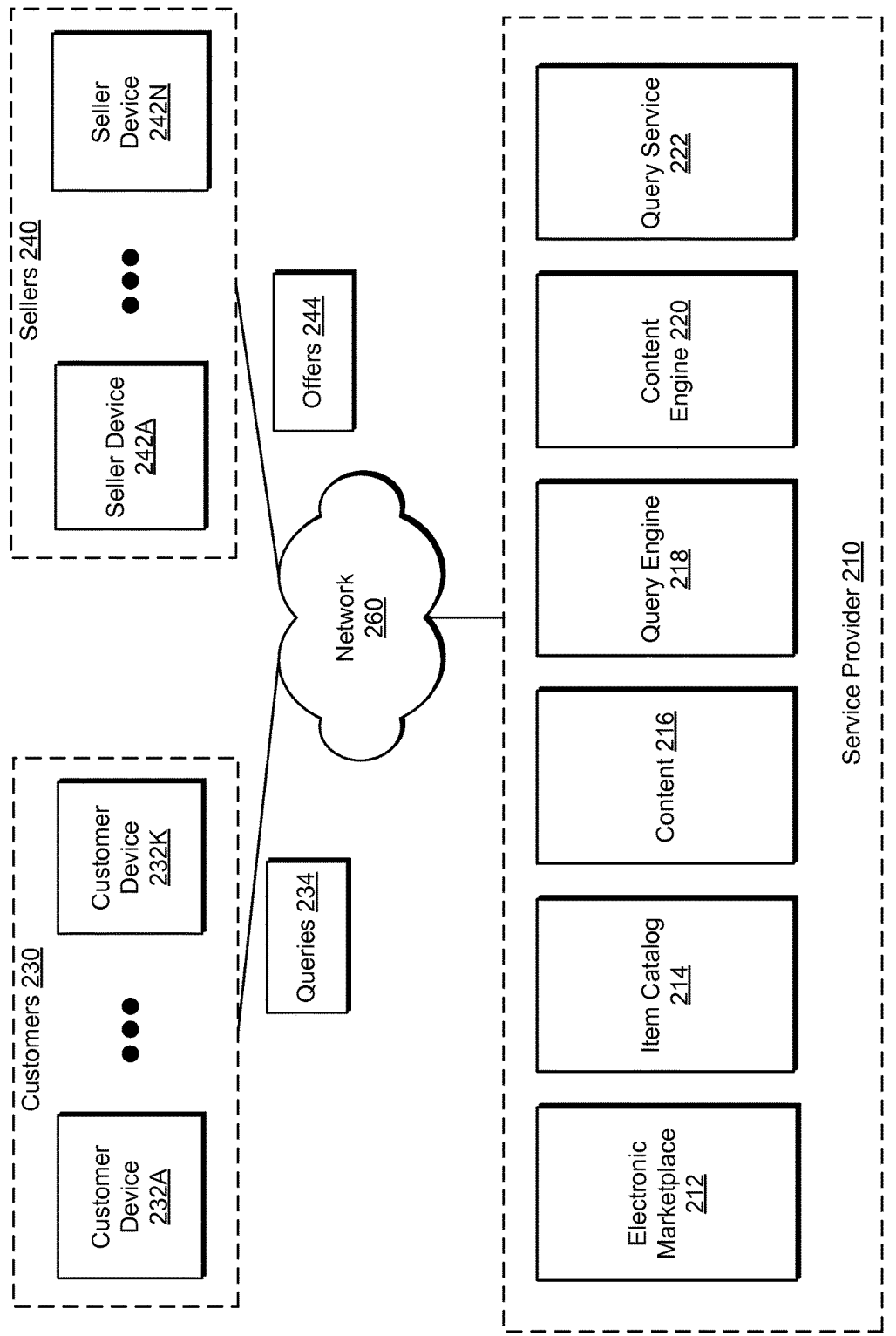
FIG. 2 illustrates an example computing environment associated with an electronic marketplace offering items, according to embodiments.

Turning to FIG. 2, that figure illustrates a computing environment for implementing the above-described features in association with an electronic marketplace. In particular, a service provider 210 of an electronic marketplace 212 may implement a query service 222 on a service provider computing resource. The query service 222 may be configured to augment a query result with additional information based on a context associated with a query.

The electronic marketplace 212 may offer different items. In an example, the electronic marketplace 212 may provide a network-based resource, such as a web site, to access information about the offered items. The electronic marketplace 212 may also provide an electronic platform to offer the items and to maintain information about the items and the offers. For example, the offered items may be cataloged in an item catalog 214. The item catalog 214 may represent a data structure describing the information about the items. An item may be associated with one or more pages of the item catalog 214, where the page(s) may describe attributes of the item, the offer, and other information associated with offering the item at the electronic marketplace 212.

A network-based document (e.g., a web page, a detail page, etc.) of the electronic marketplace 212 may be associated with an item. The network-based document may use information from the item catalog 214. In an example, the network-based resource document may allow sellers 240 and/or the service provider 210 to define offers of items. For instance, the sellers 240 may list offers 244. The provided information may be added to the item catalog 214. The network-based document may also allow customers 230 to review the information available from the item catalog 214

(e.g., offers of items) and make an order or purchase decision. The customers 230 may, for example submit queries 234 for information about different items.

The query service 222 may be configured to receive and analyze the queries 234 to determine keywords of the queries 234 and contexts associated with the queries 234. In response, the query service 222 may return query results, where each result may include respective information from the item catalog 214 and additional information from content 216.

In an embodiment, the query service 222 may interact with a query engine 218 (e.g., via one or more application programming interfaces (APIs)) to determine information from the item catalog 214. For example, the query service 222 may provide one or more keywords of a query to the query engine 218. In turn, the query engine 218 may match the keyword(s) to descriptions from the item catalog 214 and may return associated pages (or detail pages) or summaries thereof to the query service 222.

The query service 222 may also interact with a content engine 220 (e.g., via APIs) to determine the additional information (e.g., particular promotional, editorial, and/or store content) from the content 216. In turn, the content engine may return the additional information based on association of the additional information with the item catalog 214 and/or with keywords of the query. Example associations of the additional information with the item catalog 214 are further illustrated in FIG. 4.

The query service 222 may also generate a query result based on the received information and additional information. The query result may include both types of information. For example, the query service 222 may insert or inject the additional information in the query result received from the query engine 218 (e.g., the result containing the information from the item catalog 214). In other words, rather than returning two different query results corresponding to the two engines, the query service 222 may return a single, augmented query result. Thus, a computing device a customer may present both types of information in a same space configured to present the query result. This type of functionality may be contrasted to presenting a query result of a query engine in one space and additional information of a content engine in a separate and independent space.

In an embodiment, other configurations of the query engine 218, the content engine 220, and the query service 222 may be possible. For example, the query service 222 may be integrated in one or both of the query engine 218 and the content engine 220. Similarly, the query engine 218 may integrate the content engine 220 or vice versa. In another example, the query service 222 may send a query of a customer to the query engine 218 (e.g., via an API call). In turn, the query engine 218 may generate a query result based on the query. The query engine 218 may also determine additional information from the content engine 220 (e.g., via an API call) and may augment the query result to include the additional information.

In a further embodiment, the content engine 220, or some computing service hosted on a service provider computer, may provide an interface (e.g., a web interface, an API, etc.) to import or develop content. For example, an authorized user may use the interface to define the content or identify a source thereof. This content may be stored as part of the content 216.

As such, the service provider 210 may operate the electronic marketplace 212 to facilitate interactions between the service provider 210, the customers 230, and the sellers 240 over a network 260. Each one of the sellers 240 may operate one or more seller devices 242A-N to access the electronic marketplace 212 and perform various seller-related functions. A customer may be an item recipient, a buyer, or any user reviewing, browsing, ordering, obtaining, purchasing, or returning an item of a seller. Each one of the customers 230 may operate one or more customer devices 232A-K to access the electronic marketplace 212 and perform various customer-related functions.

Figure 3:
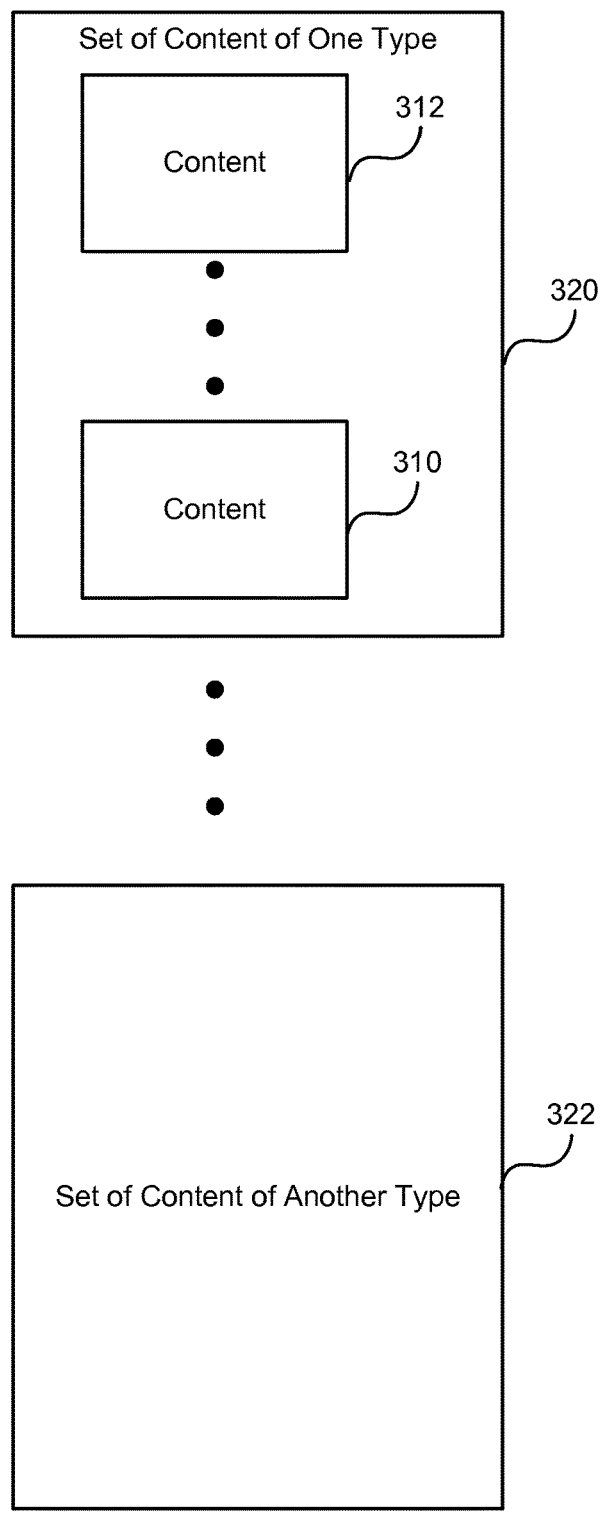
FIG. 3 illustrates an example of content associated with items, according to embodiments.
Figure 4:
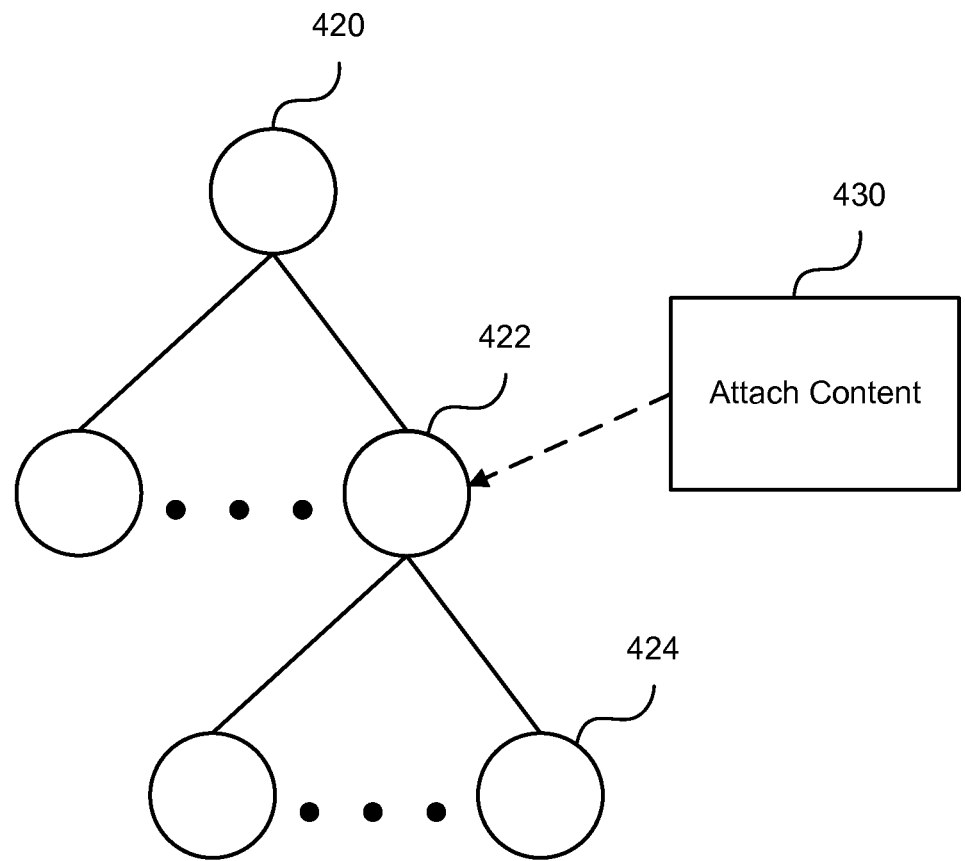
FIG. 4 illustrates an example tree structure associated with items, according to embodiments.

Additional information inserted in a query result may represent particular content available from a set of content. The set of content may be defined separately from an item catalog. For example, an authorized user may use a content development tool to develop the content. The authorized user may also use a content engine to store and associate the content with the item catalog and/or with query keywords. FIGS. 3 and 4 illustrate examples of content and of techniques for associating the content.

Turning to FIG. 3, there may be different types of content. For example, editorial, promotional, and store content may be developed. Content of a same type, such as content 310 and 312 may be grouped together in a same set of content 320. For example, the set of content 320 may represent promotional content. In comparison, a set of content 322 may represent editorial content. Further, each set may include a number of content that may relate to one or more items or item categories. For example, the set of content 320 may include five promotions (or some other number) about running shoes (or some other item category). In comparison, the set of content 322 may include ten editorials (or some other number) about dress shoes of a particular brand (or some other items).

Multiple techniques may be implemented to associate content (or a set of content) with one or more items or item categories. In an example, the content may be associated with an item catalog by attaching the content to the item catalog. The attachment may include adding a reference to the content in one or more pages of the item catalog. Such pages may correspond to the one or more items. In another example, the content may be associated with the item catalog by adding the content to the one or more pages. In yet another example, rather than associating the content with the item catalog, the content may be associated with keywords related to the one or more items (e.g., query keywords). For instance, a query service, a content engine, and/or a query engine may maintain a list of the keywords. When a query is received containing one or more of the keywords, the content may be identified as relevant to the query.

FIG. 4 illustrates example implementations of such techniques. In particular, the item catalog may be represented in a tree structure, or some other hierarchical structure, including a number of nodes. Each node may correspond to one or more pages of the item catalog and may, accordingly, represent one or more items. For example, a node 420 may represent an item category (e.g., women's fashion) that may include a large number of items (e.g., clothing, shoes, accessories, etc.). The node 420 may be a parent to a plurality of child nodes including a node 422. This node 422 may represent an item sub-category (e.g., women's running shoes). This hierarchy may be repeated at several levels, such that the node 422 may have a number of child nodes, each of which may be in turn a parent to a number of other child nodes. At one level of the hierarchy, a node 424 may be a child node than may be traced back to the node 422. This node 424 may represent a particular item (e.g., a particular brand and model of women's running shoes).

The tree structure may be used by a network-based resource of the electronic marketplace, such as a web site, to present information from the item catalog. For example, each node may correspond to a browse node of the web site. Each browse node (e.g., web page) may be populated with information from the corresponding page(s) of the item catalog.

Furthermore, the tree structure may be used to associate the content with the items. For example, the content may be attached 430 to a node (e.g., the node 422). The attachment may include adding, to the node, a reference to the content. The attachment may then be propagated upward (e.g., to parent nodes such as the node 420), downward (e.g., to child nodes such as the node 424), or horizontally (e.g., to sibling nodes at a same hierarchical level). In an example, the propagation may be set-up to occur automatically. Thus, it may be sufficient to attach 430 the content once for the attachment to automatically propagate to other nodes. For example, if the content is a promotion about women's running shoes, it may sufficient to attach 430 the content to the node 422 (e.g., the node representing the women's running shoes). This attachment may be then automatically propagated downward to all child nodes representing different brands and styles of women's running shoes.

In an embodiment, the attachment may be also automatically propagated to keywords. For example, once the content attaches to a node, the content may be automatically associated with keywords relevant to one or more items represented by the node.

Hence, using the tree structure may efficiently associate content with items. For example, it may be sufficient to attach the content to one node of the tree for the attachment to be propagated to other nodes and the content automatically associated with respective items and/or item categories. In other words, an authorized user may need to only attach the content to one or a small number of nodes, rather than to every node that may be of interest. This automatic propagation may further improve querying databases. For example, the associations may be available to the query service, query engine, and/or query content to query databases storing information and content and to return augmented query results.

Figure 5:
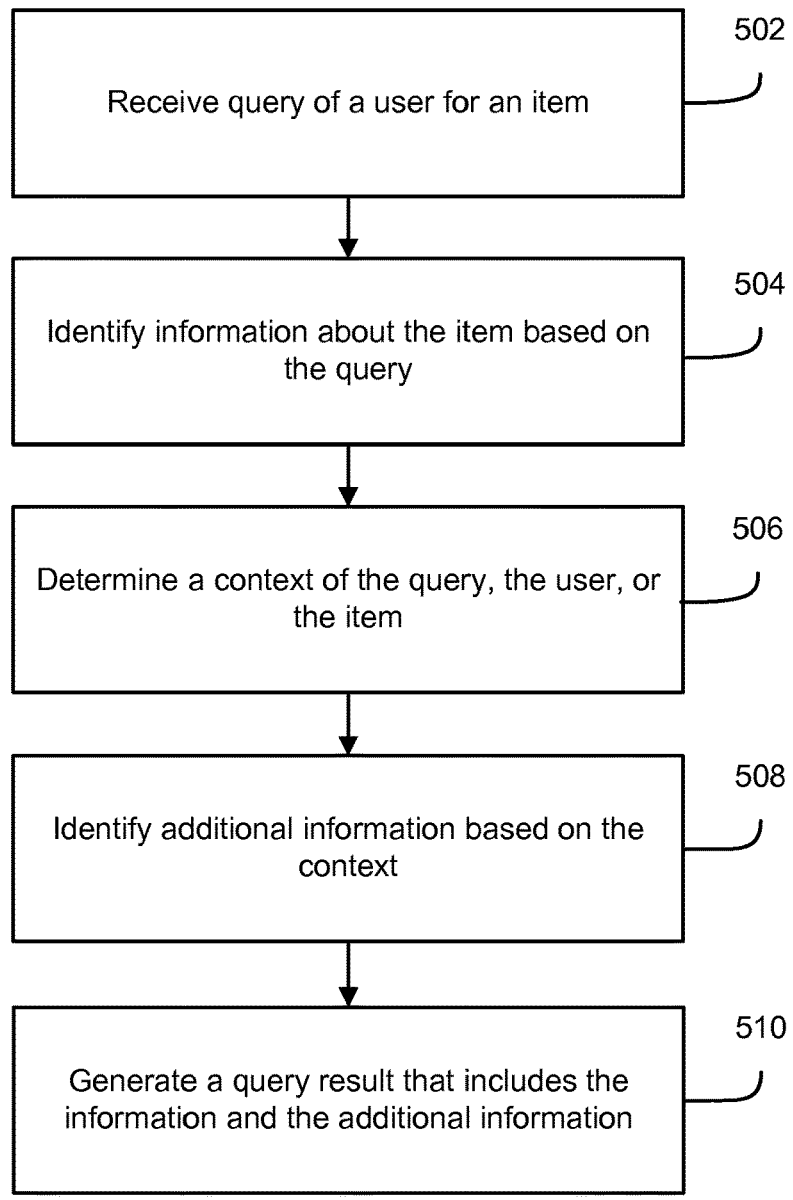
FIG. 5 illustrates an example flow for providing information about items, according to embodiments.
Figure 6:
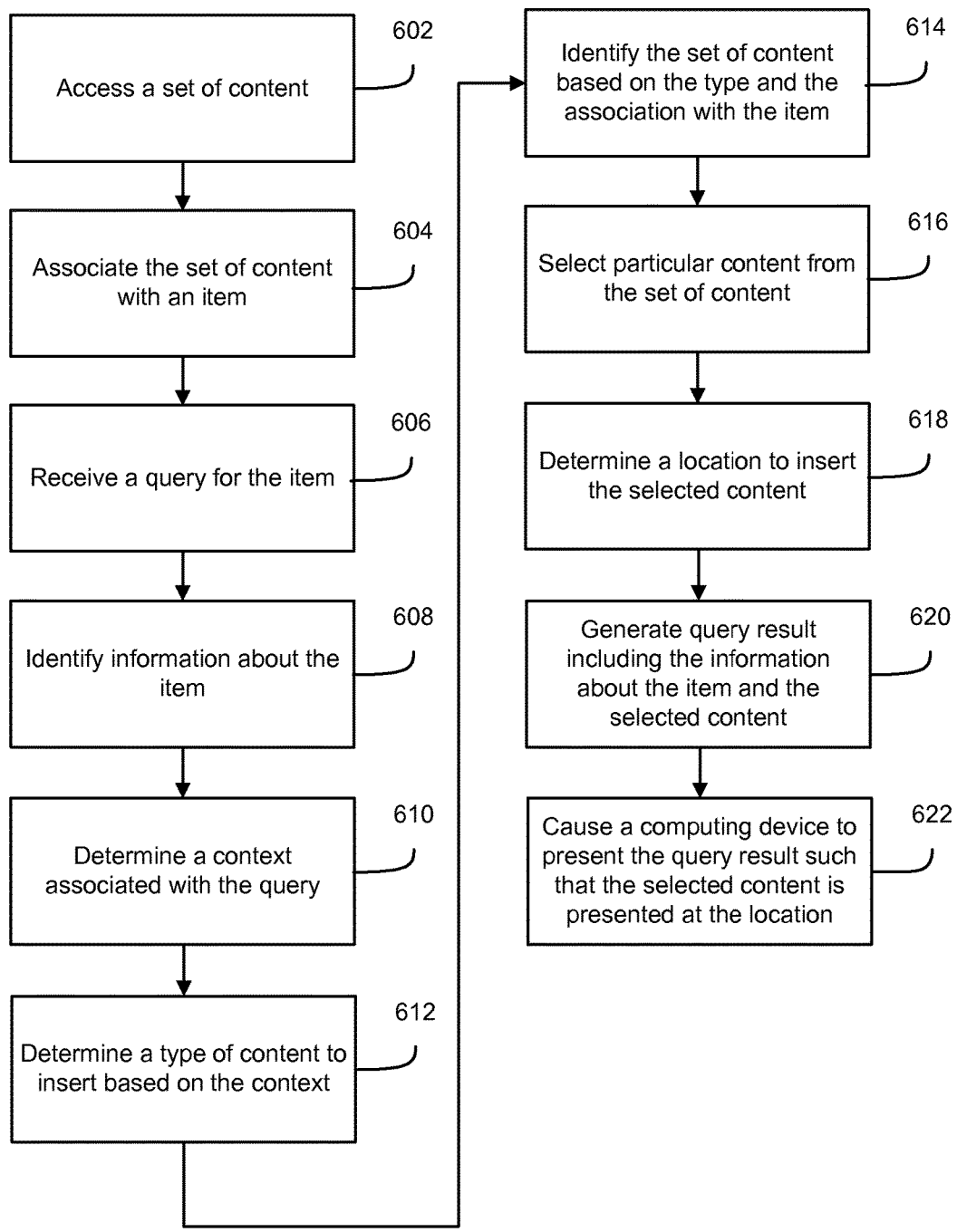
FIG. 6 illustrates an example flow for providing and presenting information about items, according to embodiments.
Figure 7:
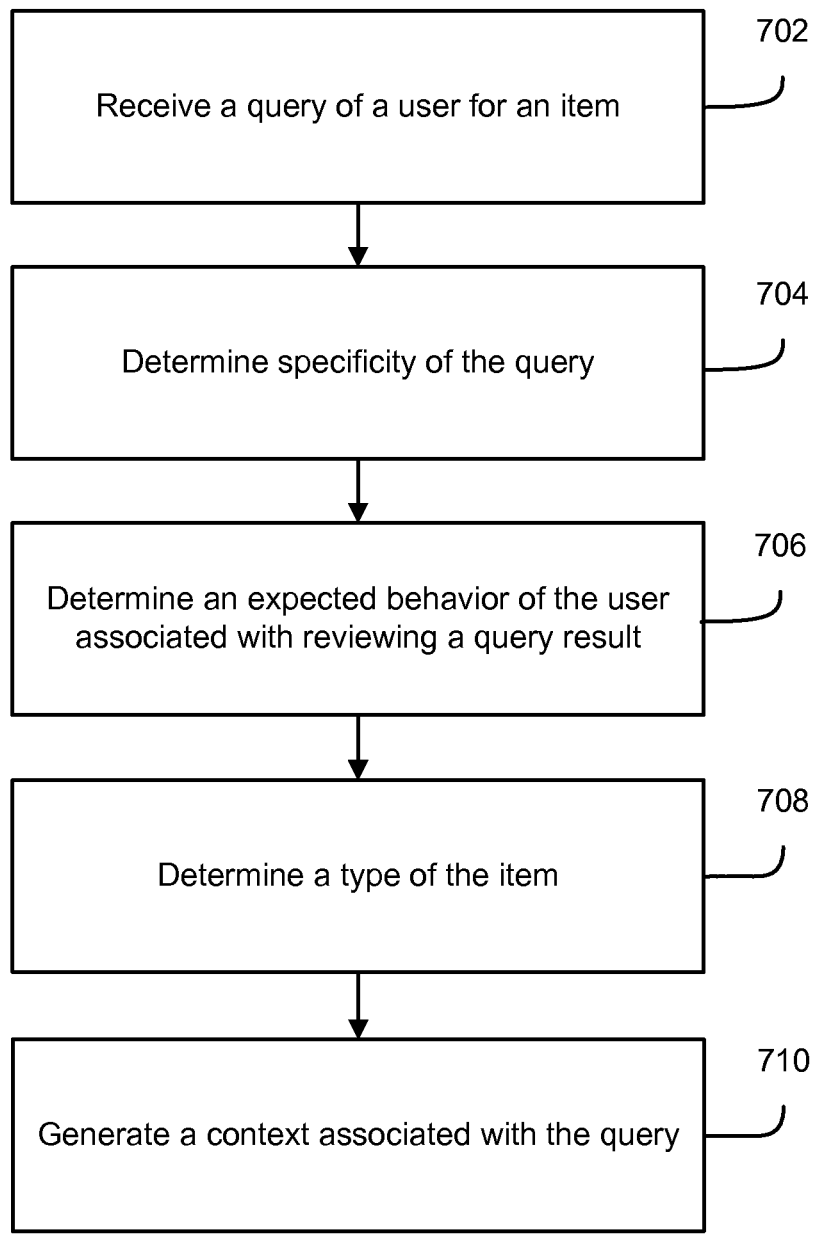
FIG. 7 illustrates an example flow for generating a context associated with a query for an item, according to embodiments.
Figure 8:
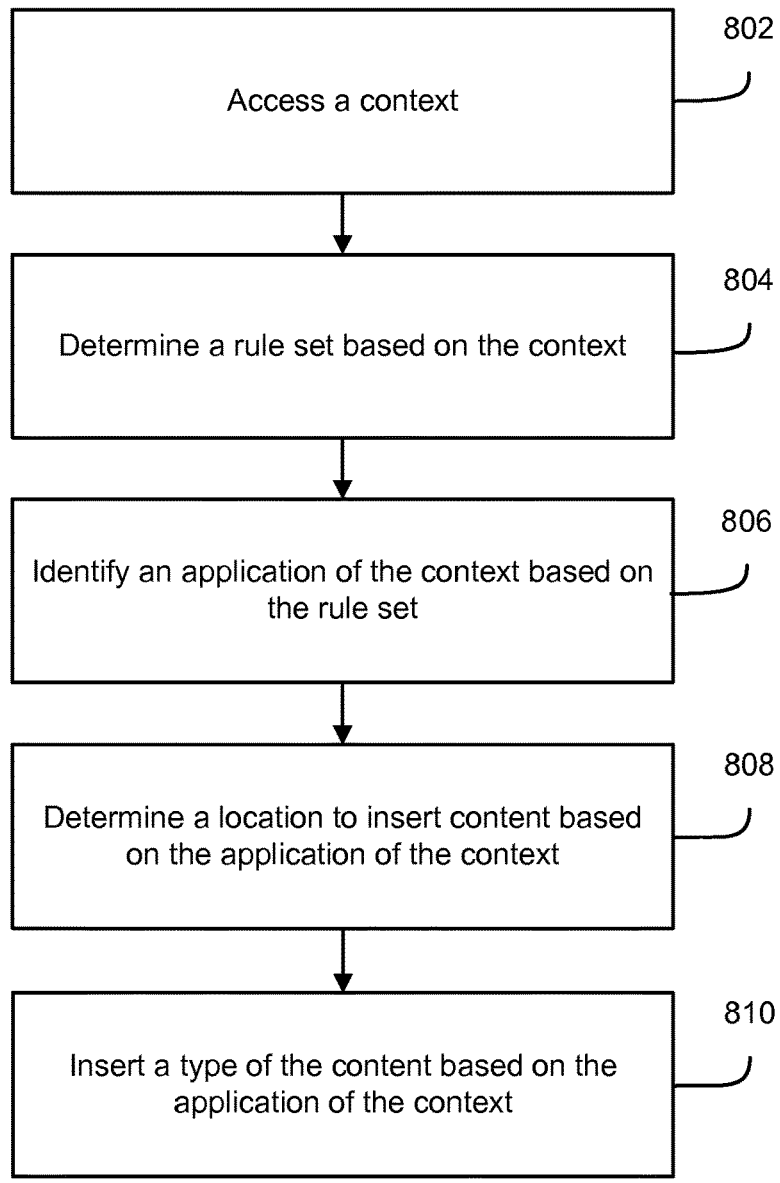
FIG. 8 illustrates an example flow for presenting information about items, according to embodiments.

Turning to FIGS. 5-8, the figures illustrate example flows related to providing query results. In particular, FIG. 5 illustrates an example flow for providing information about one or more items in response to a query. FIG. 6 illustrates another example flow for providing and presenting the information based on a context associated with the query. In comparison, FIG. 7 illustrates an example flow for determining the context and FIG. 8 illustrates an example flow for using the context. Some operations of the example flows may be similar. Such similarities are not repeated herein in the interest of clarity of explanation.

In the illustrative operations, some of the operations or functions may be embodied in, and fully or partially automated by, computing modules and/or computing services executed by one or more processors. For example, a query service, a query engine, and/or a content engine hosted on one or more computing resources may be configured to perform some of the operations. Nevertheless, other, or a combination of other, computing devices, modules, and services may be additionally or alternatively used. Also, while the operations are illustrated in a particular order, it should be understood that no particular order is necessary and that one or more operations may be omitted, skipped, and/or reordered.

Turning to FIG. 5, the illustrated example flow may start at operation 502, where a query for an item may be received. For example, the query may be received from a computing device of a user and may include one or more keywords. The keyword(s) may represent a search for information about items. At operation 504, information about the item may be identified based on the query. For example, the keyword(s) of the query may be matched to a description or attributes of the item based on a tree structure, such as a catalog. The tree structure may maintain the information about the item. A relevance of the match may be used to rank the information about the item relative to that of other matched items.

At operation 506, a context associated with the query may be determined. This context may be a context of the query, the user, and/or the item. The context of the query may indicate how specific the query may be. The context of the user may indicate an expected behavior of the user. The expected behavior may relate to how the query results may be viewed. The context of the item may indicate a type (or category) of the item and an associated rule.

At operation 508, additional information may be identified based on the context. For example, the additional information may represent one or more content, such as editorial, promotional, and/or store content available from a set of content. The additional information may relate to the item and/or to other items and may be identified based on an association of the set of content with the item. The association may include attachments to some or all of the keywords and/or to the tree structure. In a way, the additional information may be used to augment a query result such that a likelihood of abandonment may be reduced and/or a likelihood of a conversion (e.g., a user selecting one of the items for additional review and/or purchase) may be increased.

At operation 510, a query result may be generated based on the query and the context. For example, the query result may include the information and the additional information. Further, the query result may be provided to the computing device of the user in response to the query. The information and the additional information may be presented at different locations of a same space configured to present the query result.

The query result may be augmented by inserting the additional information. FIG. 6 illustrates an example flow for augmenting the query result. In particular, the example flow may start at operation 602, where a set of content may be accessed. The set of content may be of a particular type (e.g., promotional, editorial, and/or store content) and may include a number of content (e.g., five promotions). A data store may store and provide access to the set of content.

At operation 604, the set of content may be associated with an item. Various types of associations may be used. In an example, the set of content may be attached to one or more keyword(s) descriptive of the item (e.g., attributes of the item, attributes of related offers for the item, etc.). In another example, the set of content may be attached, directly or through propagation, to a node representative of the item. In yet another example, the set of content may be attached to the node and the attachment may be propagated to the keyword(s). Regardless of the association type, the association may be used to identify additional information (e.g., particular content from the set) in response to a query related to the item.

At operation 606, a query for the item may be received. For example, the query may include some or all of the keywords descriptive of the item and/or of other items. At operation 608, information about the item may be identified based on the query based on, for example, matching the information and the keywords. A query result may be generated and may include the information about the item. At operation 610, a context associated with the query may be determined. FIG. 7 illustrates an example flow for determining the context. Generally, the context may include a query context, a user context, and/or an item context.

At operation 612, a type of content (e.g., promotional, editorial, or store content) may be determined based on the context associated with the query. By using the context, affinities between the inserted content and the context may be considered, thereby reducing a likelihood of abandonment and increasing a likelihood of conversion. The query context, user context, and/or item context may be used together and/or independently of each other to determine the type of content.

For example, the type of content may be determined based on specificities of queries. Promotional content may be used to target more specific queries, whereas editorial or store content may be used to target broader queries. In another example, the type of content may be determined based on an expected behavior of the user. The more sophisticated the user may be (e.g., the user knowing exactly what to search for), the more applicable the promotional and store content may be. In yet another example, the type of content may be determined based on a category of the item. The more sophisticated the item may be (e.g., an item tied to an ecosystem, such as a smart phone from a particular provider, compared to an item that may be equivalently replaced by other items, such as a pair of shoes), the more applicable the promotional and store content may be.

At operation 614, a set of content may be identified based on the type of content (e.g., as determined at operation 610) and the association of the set of content with the item (e.g., as determined at operation 604). Identifying the set of content may facilitate inserting additional information (e.g. particular content from the set) in the query result. In an example, the set of content may be flagged as a potential set based on the association and then selected as the set from potential sets based on the determined type of content (e.g., if the set is of the same type).

At operation 616, particular content from the set of content may be selected. The selected content may be inserted in the query result. Various selection techniques may be implemented to select the particular content. In one example, random selection may be performed. In another technique, random selection from non-previously selected content be performed. In yet another example, the content of the set may be queued in a certain order and the selected content may be based on the order. In a further example, the content may be selected based on the user context. In this example, the selected content may represent personalized content.

At operation 618, a location to insert the selected content may be determined. The location may represent a particular location or position in a space of a user interface for presenting the query result. Determining the location may allow presenting the selected content in conjunction with the information about the item (e.g., the information determined based on the query at operation 608) as portions of the same query result. For example, the query result may be presented across multiple page views, where each page view may include a number of available locations. Each of the available locations may be used to present some of the information about the item or some of the additional information (e.g., one or more of selected content).

In an example, locations available for additional content (e.g., content locations) may be predefined or static. For example, the available content locations may be tagged with identifiers of whether additional information may be inserted. Accordingly, an available location tagged as usable for additional information (e.g., an available content location) may be identified as the location for inserting the selected content. This identification may in turn be static or dynamic. In particular, if the identifier of the available content location is specific to the type of the selected content, the selected content may be inserted in this location; otherwise, the selected content may be inserted in another available content location. Alternatively, the relevance of the selected content may be used such that more relevant selected content may be inserted in earlier available content locations (e.g., at an available content location in one of the earlier page views).

In another example, available content locations may be dynamic. In other words, whether an available location may be used to insert additional information (e.g., content) may change rather than being statically predefined. Determining an available content location for the selected content may be based on the context associated with the query such as on one or more of the query context, user context, or item context. FIG. 8 illustrates an example flow of using a context to determine an available content location. In an example, the more specific the query, the earlier the available content location may be. This may reflect an assumption that a user's interest may be more specific, which may result in a faster abandonment. Similarly, the more sophisticated the user and/or the item, the earlier the available content location may be.

At operation 620, a query result including the information about the item (e.g., the information determined at operation 608) and the selected content (e.g., the content selected at operation 616) may be generated. For example, a query result including the information may be augmented to also include the selected content. Augmenting the query result may represent inserting the selected of content in the query result with identifiers or instructions associated with presenting the content (e.g., based on the content location determined at operation 618).

At operation 622, the generated query result may be provided to a computing device, thereby causing the computing device to present the query result. For example, the computing device may receive and present the query at the user interface. The selected content may be presented at the determined content location in the space of the user interface.

The context associated with the query may be used, among other things, to determine what content to select and where to present the selected content. FIG. 7 illustrates an example flow for determining the context. In comparison, FIG. 8 illustrates an example flow for using the context.

The example flow of FIG. 7 may start at operation 702, where a query of a user for an item may be received. For example, the user may operate a computing device to submit the query. The query may reflect a certain level of interest of the user in certain items.

At operation 704, a specificity of the query may be determined. This specificity may represent a query context. In an example, various parameters may be used to determine the specificity. The parameters may include the number of keywords in the query, associations of the keywords with the item (e.g., how relevant the item may be in query result based on the keywords), amount of found information (e.g., how many items may have been identified based on the keywords), relevance of the information (e.g., how may items presented in a query result may have been viewed, clicked, or selected), and/or past outcomes of the same or a similar query. The past outcomes may represent lost opportunities. For example, the past outcomes may include an abandonment rate, a reformulation rate, and/or a page or click depth before abandonment or reformulation. In an example, some or all of the parameters may be based on historical data. For instance, the specificity of a query may be measured as a function of distinct selections or clicks of items (or of information about the items) from historical query results that may correspond to the query. Different degrees of the specificity may be expressed based on the historical data. For instance, a high specificity may mean that a few items may have been selected per query result, indicating that the query may be narrow. A low specificity may mean that a larger number of items may have been selected per query result, indicating that the query may be broad.

The various parameters may be used in conjunction or independently of each other to determine the specificity. For example, the query may be found to be more specific based on a higher number of keywords, more relevant keywords, a lower number of found items, a lower abandonment rate, a lower reformulation rate, and/or a smaller page or click depth before abandonment or reformulation.

The determined specificity (or query context) may be associated with a rule reflecting a strategy for providing additional information to the user. For example, the rule may specify the content type and the content location. In particular, the rule may indicate that the more specific the query, the more targeted the content may be (in type and location). For instance, the rule may specify that promotional content may be presented at an earlier content location if the query is specific and at a farther content location if the query is broad. In an embodiment, the determined specificity may be mapped to one or more predefined ranges of specificity. In turn, the rule may specify the applicable content type and content location based on the ranges.

At operation 706, an expected behavior of the user may be determined. The expected behavior may be associated with reviewing a query result, such as with how the user may interact with the query result. Various parameters may be used to determine the expected behavior. Some of the parameters may be associated with a history of the user. The same or other parameters may be associated with a history of other users, including users that may have submitted the same or similar queries.

The parameters may include, for example, a click stream, a history of queries and resulting outcomes (e.g., purchase, abandonment, reformulation, etc.), active and passive actions performed in association with reviewing past query results, abandonment rates, reformulation rates, and/or page or click depths before abandonment or reformulation. Various analysis techniques, such as pattern recognition, regression models, and/or machine learning algorithms may be implemented to analyze realizations of one or more of the parameters and to output potential groups of expected behavior. Based on the current query (or keywords thereof) and/or a clickstream leading thereto, the expected behavior may be identified from the potential groups.

The expected behavior (or user context) may be associated with a rule that may also reflect the above strategy. For example, the rule may specify the content type and the content location based on the expected behavior. In particular, the rule may indicate that the more sophisticated the expected behavior, the more targeted the content may be. For instance, the rule may specify that promotional content may be presented at an earlier content location if the user is expected to view a small number of page views before abandonment or reformulation. In an embodiment, the expected behavior (or the potential groups of behavior) may be mapped to one or more predefined ranges of behavior. In turn, the rule may specify the applicable content type and content location based on the ranges.

At operation 708, a type of the item may be determined. For example, the type may be determined from the query or from items found in response to the query and may include a context of the item. The type may include, for example, a category of items and may be associated with a rule. Here again, the rule may be associated with the above strategy. Because not all items may or should be treated the same way, the rule may also reflect an optimization approach. This approach may vary the parameters to use and, thus, the resulting content type and content location, based on the item type.

The rule may have been generated based on historical data associated with the item type. For example, the parameters may include historical abandonment rate, reformulation rate, and/or page or click depth before abandonment or reformulation. The parameters may also include identifiers of content type and content locations that may have resulted in higher conversion rates (e.g., user purchases). The rule may also define weights for weighing the different parameters when used in conjunction. For example, the rule may specify that for less sophisticated items (e.g., items that may be equivalently replaced, such as two models of running shoes), the query context and item context may be given more weight. In comparison, for more sophisticated items (e.g., a specific item that may not be easily substituted with another similar one, such as computing device tied to a particular ecosystem), the rule may allocate more weight to the user context. In a further illustration and based on historical realizations, if for a particular item type, inserting a particular content type at a particular content location may have resulted in a higher conversion rate, the rule may allocate more weight to the item type.

At operation 710, a context associated with the query may be generated. For example, the context may include the query context, the user context, and/or the item context. The generated context may be used to determine what content to select and where to present the selected content. For example, the generated context may identify static content locations to insert specific types of content. In another example, the generated context may be used to dynamically determine the content locations and applicable content types. An example flow for using the context is further illustrated in FIG. 8.

Turning to FIG. 8, the example flow may start at operation 802, where a context associated with a query may be accessed. For example, in response to the query, the context may be generated in part as described in the example flow of FIG. 7 and may include query, user, and/or item contexts.

At operation 804, a rule set may be determined based on the context. The rule set may include one or more rules associated with one or more of the query, user, or item contexts. For example, based on the type of a queried item(s), the rule set may identify how to weigh various parameters associated with the different context types.

At operation 806, an application of the context may be identified based on the rule set. The application may identify how to apply the context based on the weights of the rule set. In an example, the rule set may specify that the content types and the content locations may be static. Thus, parameters of the query context and user context may be given little to no weight. In another example, the rule set may specify that the content types and the content locations may be dynamically determined. In this example, the rule set may define how the different parameters may be applied to determine the content types and content locations.

At operation 808, a location to insert content (e.g., a content location) may be determined based on the application of the context. For example, if the rule set indicates a static location, that location may be used as the content location. In another example, if the rule set indicates a dynamic location, the various parameters may be weighted to determine that location. For example, the more specific the query, the earlier the location may be. Similarly, the more sophisticated the user or the queried item(s), the earlier the location may be.

At operation 810, a type of content to insert in the content location may also be determined based on the application of the context. For example, if the rule set indicates a specific content type, that type may be used for the content location. In another example, if the rule set indicates a dynamic content type, the various parameters may be weighted to determine that type. For example, the more specific the query, the more targeted the content type may be (e.g., promotional content in contrast to editorial content). Similarly, the more sophisticated the user or the queried item(s), the more targeted the content may be.

Turning to FIG. 9, that figure illustrates an example end-to-end computing environment for providing information based on a query and additional information based on a context associated with the query. In this example, a service provider may implement a query service, query engine, and/or content engine to facilitate providing the information and additional information. The information may be available from a seller 910. The additional information may be available from the seller 910 and/or the service provider. The information and the additional information may be provided to a customer 960.

In a basic configuration, a seller 910 may utilize a seller device 912 to access local applications, a web service application 920, a seller account accessible through the web service application 920, a web site or any other network-based resources via one or more networks 980. In some aspects, the web service application 920, the web site, and/or the seller account may be hosted, managed, and/or otherwise provided by one or more computing resources of the service provider, such as by utilizing one or more service provider devices 930. The seller 910 may use the local applications and/or the web service application 920 to interact with the network-based resources of the service provider and perform seller-related transactions. These transactions may include, for example, offering items for sale.

In some examples, the seller device 912 may be any type of computing devices such as, but not limited to, a mobile phone, a smart phone, a personal digital assistant (PDA), a laptop computer, a thin-client device, a tablet PC, etc. In one illustrative configuration, the seller device 912 may contain communications connection(s) that allow the seller device 912 to communicate with a stored database, another computing device or server, seller terminals, and/or other devices on the networks 980. The seller device 912 may also include input/output (I/O) device(s) and/or ports, such as for enabling connection with a keyboard, a mouse, a pen, a voice input device, a touch input device, a display, speakers, a printer, etc.

The seller device 912 may also include at least one or more processing units (or processor device(s)) 914 and one memory 916. The processor device(s) 914 may be implemented as appropriate in hardware, computer-executable instructions, firmware, or combinations thereof. Computer-executable instructions or firmware implementations of the processor device(s) 914 may include computer-executable or machine-executable instructions written in any suitable programming language to perform the various functions described.

The memory 916 may store program instructions that are loadable and executable on the processor device(s) 914, as well as data generated during the execution of these programs. Depending on the configuration and type of seller device 912, the memory 916 may be volatile (such as random access memory (RAM)) and/or non-volatile (such as read-only memory (ROM), flash memory, etc.). The seller device 912 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 916 may include multiple different types of memory, such as static random access memory (SRAM), dynamic random access memory (DRAM), or ROM.

Turning to the contents of the memory 916 in more detail, the memory may include an operating system (O/S) 918 and the one or more application programs or services for implementing the features disclosed herein including the web service application 920. In some examples, the seller device 912 may be in communication with the service provider devices 930 via the networks 980, or via other network connections. The networks 980 may include any one or a combination of many different types of networks, such as cable networks, the Internet, wireless networks, cellular networks, and other private and/or public networks. While the illustrated example represents the seller 910 accessing the web service application 920 over the networks 980, the described techniques may equally apply in instances where the seller 910 interacts with the service provider devices 930 via the seller device 912 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 960 may utilize customer device 962 to access local applications, a web service application 970, a customer account accessible through the web service application 970, a web site, or any other network-based resources via the networks 980. In some aspects, the web service application 970, the web site, and/or the user account may be hosted, managed, and/or otherwise provided by the service provider devices 930 and may be similar to the web service application 920, the web site accessed by the computing device 912, and/or the seller account, respectively.

The customer 960 may use the local applications and/or the web service application 970 to conduct transactions with the network-based resources of the service provider. These transactions may include, for example, submitting queries to search for information about items offered by the seller 910 and/or the service provider at the network-based resources, receiving query results, presenting the query results, and/or other transactions.

In some examples, the customer device 962 may be configured similarly to the seller device 912 and may include at least one or more processing units (or processor device(s)) 964 and one memory 966. The processor device (s) 964 may be implemented as appropriate in hardware, computer-executable instructions, firmware, or combinations thereof similarly to the processor device(s) 914. Likewise, the memory 966 may also be configured similarly to the memory 916 and may store program instructions that are loadable and executable on the processor device(s) 964, as well as data generated during the execution of these programs. For example, the memory 966 may include an operating system (O/S) 968 and the one or more application programs or services for implementing the features disclosed herein including the web service application 970.

As described briefly above, the web service applications 920 and 970 may allow the seller 910 and customer 960, respectively, to interact with the service provider devices 930 to conduct transactions involving items. The service provider devices 930, perhaps arranged in a cluster of servers or as a server farm, may host the web service applications 920 and 970. These servers may be configured to host a web site (or combination of web sites) viewable via the computing devices 912 and 962. Other server architectures may also be used to host the web service applications 920 and 970. The web service applications 920 and 970 may be capable of handling requests from many sellers 910 and customers 960, respectively, and serving, in response, various interfaces that may be rendered at the computing devices 912 and 962 such as, but not limited to, a web site. The web service applications 920 and 970 may interact with any type of web site that supports interaction, including social networking sites, electronic retailers, informational sites, blog sites, search engine sites, news and entertainment sites, and so forth. As discussed above, the described techniques may similarly be implemented outside of the web service applications 920 and 970, such as with other applications running on the computing devices 912 and 962, respectively.

The service provider devices 930 may, in some examples, provide network-based resources such as, but not limited to, applications for purchase and/or download, web sites, web hosting, client entities, data storage, data access, management, virtualization, etc. The service provider devices 930 may also be operable to provide web hosting, computer application development, and/or implementation platforms, or combinations of the foregoing to the seller 910 and customer 960.

The service provider devices 930 may be any type of computing device such as, but not limited to, a mobile phone, a smart phone, a personal digital assistant (PDA), a laptop computer, a desktop computer, a server computer, a thin-client device, a tablet PC, etc. The service provider devices 930 may also contain communications connection(s) that allow service provider devices 930 to communicate with a stored database, other computing devices or servers, seller terminals, and/or other devices on the network 980. The service provider devices 930 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 930 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 930 may be in communication with the computing devices 912 and 962 via the networks 980, or via other network connections. The service provider devices 930 may include one or more servers, perhaps arranged in a cluster, or as individual servers not associated with one another.

In one illustrative configuration, the service provider devices 930 may include at least one or more processing units (or processor devices(s)) 932 and one memory 934. The processor device(s) 932 may be implemented as appropriate in hardware, computer-executable instructions, firmware, or combinations thereof. Computer-executable instruction or firmware implementations of the processor device(s) 932 may include computer-executable or machine-executable instructions written in any suitable programming language to perform the various functions described.

The memory 934 may store program instructions that are loadable and executable on the processor device(s) 932, as well as data generated during the execution of these programs. Depending on the configuration and type of the service provider devices 930, the memory 934 may be volatile (such as random access memory (RAM)) and/or non-volatile (such as read-only memory (ROM), flash memory, etc.). The service provider devices 930 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 934 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 934 in more detail, the memory may include an operating system (O/S) 936, code for an electronic marketplace 938, data related to an item catalog 940, data related to available content 942, code for a query service 944, code for a query engine 946, and code for a content engine 948. Although FIG. 9 illustrates the various data as stored in the memory 934, this data or portion of the data may be additionally or alternatively stored at a storage device remotely accessible to the service provider devices 930. Further, query service 944 may be integrated with one or both of the query engine 946 and the content engine 948. Similarly, the query engine 946 and the content engine 948 may be integrated as a single engine.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    associating, by a computer system, a set of content related to a plurality of items with a catalog describing the plurality of items, the plurality of items offered at an electronic marketplace based at least in part on the catalog;
    receiving, by the computer system from a computing device of a user, a query for an item offered at the electronic marketplace, the query comprising keywords;
    determining, by the computer system, a context indicating a specificity of the query, the context determined based at least in part on an abandonment rate associated with the keywords;
    identifying, by the computer system, information about the item from the catalog based at least in part on the query;
    generating, by the computer system, a query result comprising the information about the item;
    identifying, by the computer system, content from the set of content based at least in part on a rule, the rule specifying a content type and a presentation location based at least in part on the specificity of the context, the content identified based at least in part on a determination that the content is of the content type and on the associating with the catalog;
    inserting, by the computer system, the content from the set of content in the query result; and
    providing, by the computer system to the computing device of the user, the query result, the providing causing the computing device to present the information about the item in a first location of a space in a user interface and to present the content related to the one or more items at the presentation location of the space, the space configured to present the query result.

2. The computer-implemented method of claim 1, wherein the first location is determined based at least in part on relevance of the information about the item relative to the query, and wherein the presentation location is predefined.

3. The computer-implemented method of claim 1, wherein the presentation location is determined based at least in part on the context.

4. The computer-implemented method of claim 1, wherein the catalog comprises pages about the plurality of items and is represented in a tree structure, wherein the set of content is separate from the catalog, is stored in a data store, and is attached to nodes of the tree structure, wherein the query result is generated from a page of the catalog corresponding to the item, wherein the content is attached to the page and is inserted in the query result to generate an augmented query result, and wherein providing the query result comprises providing the augmented query result such that the augmented query result is presented in the space.

5. The computer-implemented method of claim 1, wherein the rule specifying that the higher the specificity of the query is, the earlier the presentation location of the content is in the space, the rule further specifying that the higher the specificity of the query is, the more specific the content type is to the item.

6. One or more computer readable media comprising instructions that, when executed with one or more processors, cause a system to at least:
    receive a query of a user, the query associated with an item and comprising keywords;
    determine a context that indicates a specificity of the query, the context determined based at least in part on an abandonment rate associated with the keywords;
    identify, from a catalog, information about the item based at least in part on the query;
    identify additional information about at least an additional item based at least in part on a rule, the rule specifying an information type and a presentation location based at least in part on the specificity of the context, the additional information identified based at least in part on a determination that the additional information is of the information type and on an association of the additional information with the catalog; and provide a query result comprising the information for presentation in a first location of a space of a user interface and comprising the additional information for presentation in the presentation location of the space.

7. The one or more computer readable media of claim 6, wherein the item and the additional item are offered at an electronic marketplace based at least in part on the catalog, wherein the catalog comprises a page containing the information about the item and a reference to the additional information, wherein the association of the additional information comprises the reference, and wherein the additional information is identified based at least in part on the reference.

8. The one or more computer readable media of claim 6, wherein the additional information comprises content that is randomly selected from a set of content associated with the additional item.

9. The one or more computer readable media of claim 6 wherein the specificity is determined based at least in part on amounts of information selected from historical results of the query.

10. The one or more computer readable media of claim 9, wherein the query result is provided to a computing device of the user for presentation at the space of the user interface, wherein providing the query result causes the computing device to present the additional information at the presentation location in the space based at least in part on the specificity.

11. The one or more computer readable media of claim 6, wherein the context further indicates user behavior associated with abandoning or reformulating the query, and wherein the query result is provided to a computing device of a user for presentation at the space of the user interface, wherein providing the query result causes the computing device to present the additional information at the presentation location in the space based at least in part on the behavior.

12. The one or more computer readable media of claim 6, wherein the context indicates the rule that defines weights associated with parameters of the query, wherein the query result is provided to a computing device of a user for presentation at the space of the user interface, wherein providing the query result causes the computing device to present the additional information at the presentation location in the space based at least in part on weighing the parameters according to the rule.

13. A system comprising:
one or more processors; and
one or more computer-readable media comprising instructions that, when executed with the one or more processors, cause the system to at least:
receive, from a computing device of a user, a query for an item, the query comprising keywords;
generate a query result comprising information from a catalog about the item based at least in part on the query;
determine a context indicating a specificity of the query, the context determined based at least in part on an abandonment rate associated with the keywords;
identify additional information about an additional item based at least in part on a rule, the rule specifying an information type and a presentation location based at least in part on the specificity of the context, the additional information identified based at least in part on a determination that the additional information is of the information type and on an association of the additional information with the catalog;
insert the additional information in the query result; and
provide the query result comprising the information for presentation at a first location in a space of a user interface and comprising the additional information for presentation at the presentation location of the space of the user interface at the computing device of the user.

14. The system of claim 13, wherein providing the query result causes the computing device of a user to present the query result in a plurality of page views at a user interface, wherein the additional information is presented in a page view of the plurality of page views based at least in part on one or more parameters, wherein the one or more parameters comprise an average number of presented page views before abandonment or reformulation of queries.

15. The system of claim 14, wherein the page view is further determined based at least in part on the specificity of the query or an indication of an expected behavior of the user associated with viewing the query result.

16. The system of claim 14, wherein the page view is further determined based at least in part on the specificity of the query, and wherein the additional information is selected from content of different types based at least in part on the specificity of the query and a category associated with the item.

17. The system of claim 13, wherein the query result is generated based at least in part on receiving the information about the item from a query engine and based at least in part on receiving the additional information from a content engine.

18. The system of claim 13, wherein the item and the additional item are offered at a network-based resource based at least in part on a tree structure, wherein the additional information is identified based at least in part on a node representative of the item.

19. The system of claim 18, wherein the additional information is attached to the node or a to a parent node of the node based at least in part on a reference to the additional information.

20. The system of claim 13, wherein the additional information is identified based at least in part on using the information about the item as a seed in a further query associated with the item.

* * * * *